(12) United States Patent
Verticchio

(10) Patent No.: US 10,129,582 B2
(45) Date of Patent: Nov. 13, 2018

(54) SYSTEMS, METHODS, AND COMPUTER PROGRAM PRODUCTS FOR CAPTURING SPECTATOR CONTENT DISPLAYED AT LIVE EVENTS

(71) Applicant: Kempt, LLC, Cincinnati, OH (US)

(72) Inventor: Kristy Marie Verticchio, Cincinnati, OH (US)

(*) Notice: Subject to any disclaimer, the term of this patent is extended or adjusted under 35 U.S.C. 154(b) by 0 days.

(21) Appl. No.: 14/986,453

(22) Filed: Dec. 31, 2015

(65) Prior Publication Data

US 2017/0006328 A1    Jan. 5, 2017

Related U.S. Application Data

(60) Provisional application No. 62/186,611, filed on Jun. 30, 2015.

(51) Int. Cl.

| | |
|---|---|
| *H04N 5/445* | (2011.01) |
| *H04N 21/4147* | (2011.01) |
| *H04N 21/2187* | (2011.01) |
| *H04N 21/44* | (2011.01) |
| *H04N 21/84* | (2011.01) |
| *G11B 27/10* | (2006.01) |
| *H04N 21/845* | (2011.01) |
| *H04N 21/278* | (2011.01) |

(52) U.S. Cl.
CPC ........ *H04N 21/4147* (2013.01); *G11B 27/10* (2013.01); *H04N 21/2187* (2013.01); *H04N 21/278* (2013.01); *H04N 21/44016* (2013.01); *H04N 21/84* (2013.01); *H04N 21/8456* (2013.01)

(58) Field of Classification Search
CPC ............. H04N 21/2665; H04N 21/21805
USPC ................................................ 725/37, 34
See application file for complete search history.

(56) References Cited

U.S. PATENT DOCUMENTS

| | | |
|---|---|---|
| 6,549,913 B1 | 4/2003 | Murakawa |
| 6,985,887 B1 | 1/2006 | Sunstein et al. |
| 7,158,689 B2 | 1/2007 | Valleriano et al. |
| 7,203,367 B2 | 4/2007 | Shniberg et al. |
| 7,346,186 B2 | 3/2008 | Sharoni et al. |
| 7,551,755 B1 | 6/2009 | Steinberg et al. |
| 7,561,723 B2 | 7/2009 | Goldberg et al. |

(Continued)

OTHER PUBLICATIONS

Ben-Ami et al., Racing Bib Number Recognition, Tel-Aviv University, 2011, 10 pages.

*Primary Examiner* — Jivka A Rabovianski
(74) *Attorney, Agent, or Firm* — Brooks Kushman P.C.

(57) ABSTRACT

Systems, methods, and computer program products for capturing spectator content displayed at live events. Spectator content that includes at least one spectator is captured from a stream of live video that is shown on a display at a live event. One or more time identifiers are determined that indicate when the spectator content is shown on the display. The spectator content and the one or more time identifiers are stored in a database such that the spectator content is linked with the time identifiers in the database. In response to receiving one or more search parameters submitted by a user, the one or more search parameters relating to at least one of the one or more time identifiers, the spectator content is retrieved from the database based on the search parameters. Thereafter, the spectator content is provided to the user.

21 Claims, 9 Drawing Sheets

(56) References Cited

U.S. PATENT DOCUMENTS

| | | |
|---|---|---|
| 7,671,902 B2 | 3/2010 | Mindrum et al. |
| 8,159,546 B2 | 4/2012 | Mindrum et al. |
| 8,442,922 B2 | 5/2013 | Martin |
| 8,466,961 B2 | 6/2013 | Sekine et al. |
| 8,831,275 B2 | 9/2014 | Goldberg |
| 2003/0103149 A1 | 6/2003 | Kinjo et al. |
| 2003/0118216 A1 | 6/2003 | Goldberg |
| 2006/0104600 A1 | 5/2006 | Abrams |
| 2007/0003113 A1 | 1/2007 | Goldberg |
| 2011/0157227 A1* | 6/2011 | Ptucha .................. H04N 5/232 345/638 |
| 2011/0251972 A1* | 10/2011 | Martin .............. G06F 17/30247 705/319 |
| 2016/0269736 A1* | 9/2016 | Holstun ............. H04N 1/32149 |

* cited by examiner

SYSTEMS, METHODS, AND COMPUTER PROGRAM PRODUCTS FOR CAPTURING SPECTATOR CONTENT DISPLAYED AT LIVE EVENTS

TECHNICAL FIELD

The present invention generally relates to image processing systems and, more particularly, to systems, methods, and computer program products for capturing spectator content displayed at live events.

BACKGROUND

Venues for hosting live events, such as sporting events, often include a large display that is centrally located so as to be viewable from practically any seat in the venue. Typically, the display shows live video of the event when the event is active. In this way, if a spectator's view of an active live event becomes hindered, the spectator can continue observing the live event by viewing the display.

Unlike persons watching a live event remotely, such as from their homes, spectators present at a live event are generally not shown commercials or other ancillary content when the live event is on break. Accordingly, when the live event is on break, it is common for the event display to show live, close-up video of the present spectators to keep the spectators entertained. Often, the event display features live video of spectators dancing, making funny faces, or waving from their seats. Many spectators at a live event thus frequent their attention to the event display during an event break to both observe other spectators and determine whether they are currently being shown on the display.

Hence, when a spectator at a live event is shown on the event display, the spectator experiences a brief moment of fame such that he or she is made particularly visible to the other spectators present at the event. However, the event display typically features any given spectator for a span of only a few seconds. As a result, a spectator currently shown on the event display has little time to memorialize his or her brief moment of fame, such as by pulling out a camera and snapping a photo of the display before it switches to another spectator or scene.

Accordingly, a need exists for improved systems, methods, and computer program products for capturing spectator content that is displayed at live events.

SUMMARY

In one embodiment, an image processing system includes one or more processors and a memory coupled to the one or more processors. The memory includes instructions that upon execution by the one or more processors cause the image processing system to capture an image of a spectator from a stream of live video that is shown on a display at a live event, determine one or more time identifiers that indicate when the image of the spectator is shown on the display, and store the image of the spectator and the one or more time identifiers in a database such that the image is linked with the one or more time identifiers within the database. In response to receiving one or more search parameters submitted by a user, the one or more search parameters relating to at least one of the one or more time identifiers, the instructions further cause the image processing system to retrieve the image of the spectator from the database based on the one or more search parameters, and provide the retrieved image to the user.

In another embodiment, a method includes capturing an image of a spectator from a stream of live video that is shown on a display at a live event, determining one or more time identifiers that indicate when the image of the spectator is shown on the display, and storing the image of the spectator and the one or more time identifiers in a database such that the image is linked with the one or more time identifiers within the database. In response to receiving one or more search parameters submitted by a user, the one or more search parameters relating to at least one of the one or more time identifiers, the method further includes retrieving the image of the spectator from the database based on the one or more search parameters, and providing the retrieved image to the user.

In a further embodiment, a computer program product includes a non-transitory computer readable medium. Instructions are stored on the computer readable medium that, upon execution by one or more processors, cause the one or more processors to capture an image of a spectator from a stream of live video that is shown on a display at a live event, determine one or more time identifiers that indicate when the image of the spectator is shown on the display, and store the image of the spectator and the one or more time identifiers in a database such that the image is linked with the one or more time identifiers within the database. In response to receiving one or more search parameters submitted by a user, the one or more search parameters relating to at least one of the one or more time identifiers, the instructions further cause the one or more processors to retrieve the image of the spectator from the database based on the one or more search parameters, and provide the retrieved image to the user.

BRIEF DESCRIPTION OF THE DRAWINGS

Embodiments of the present invention will be understood and appreciated more fully from the following detailed description taken in conjunction with the drawings.

DETAILED DESCRIPTION

Figure 1:
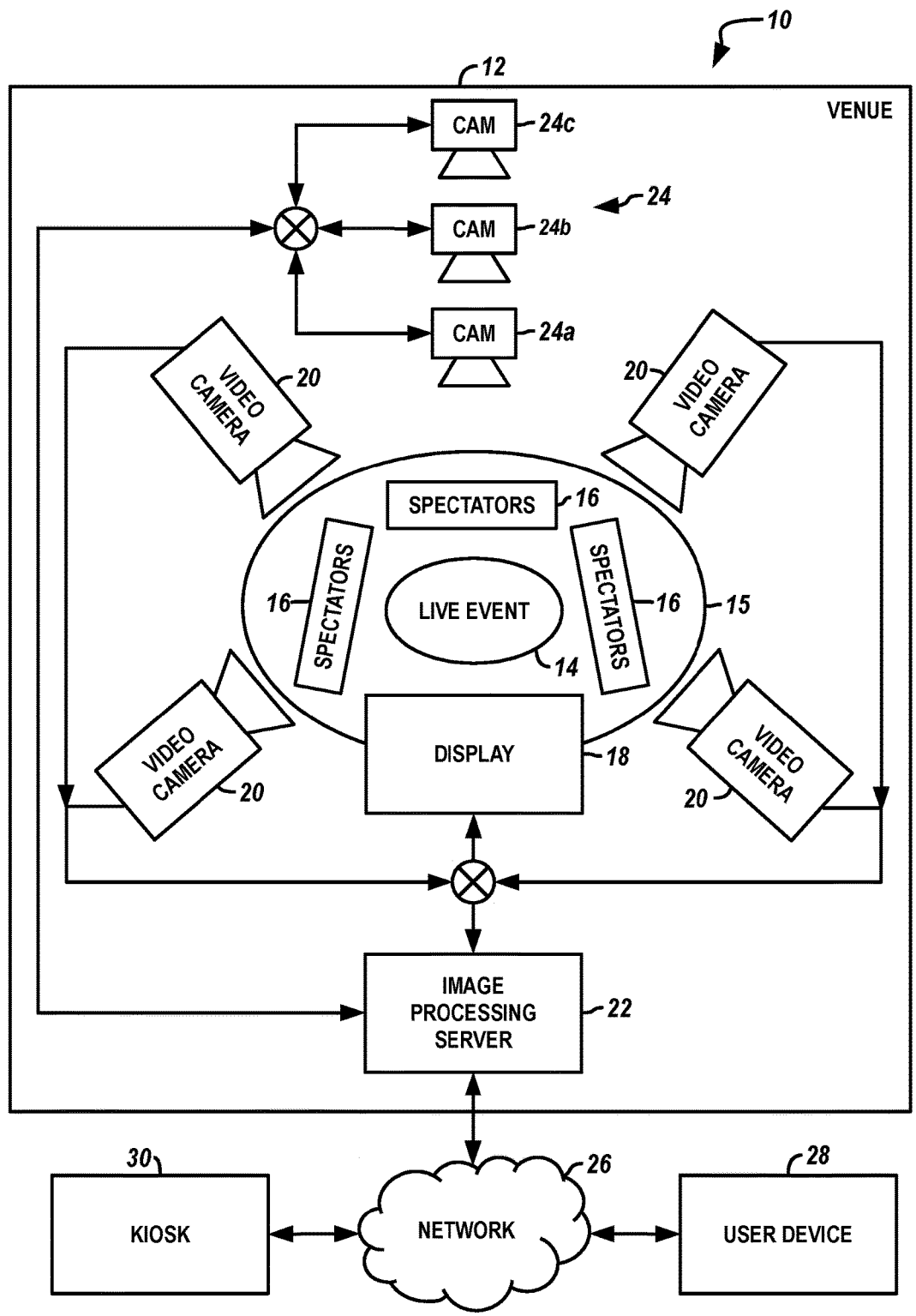
FIG. 1 is a schematic view of an exemplary operating environment that includes a plurality of computer systems and a live event.

FIG. 1 provides an exemplary operating environment 10 that may include a venue 12 for hosting a live event 14, such as a sporting event (e.g., baseball, basketball, football, hockey, tennis, soccer, Olympics, etc.), a concert, a convention, or the like. More particularly, the venue 12 may include an area dedicated to performance of the live event 14, and a seating area 15 for one or more spectators 16 who have gathered to observe the live event 14 in person. The venue 12 may further include a display 18 and one or more video cameras 20. The one or more video cameras 20 may be capable of panning across and/or moving about the venue 12 to capture live, close-up video of the live event 14 and/or the spectators 16. The video cameras 20 may further be coupled to the display 18 such that the video captured by the video cameras 20 is shown on at least a portion of the display 18 during the live event 14.

The display 18 may be a large display that is centrally positioned adjacent to the live event 14 and the seating area 15 so as to be generally viewable by any spectator 16 in the seating area 15 of the venue 12. Alternatively, the display 18 may include a plurality of displays that are positioned such that each display is viewable by at least a portion of the spectators 16 at the live event 14. In addition to the video captured by the video cameras 20, the display 18 may be configured to also provide information relating to the live event 14, such as a score, time remaining, identification of the participants in the live event 14, and the like.

The display 18 may show the live, close-up video of the live event 14 when the live event 14 is active (i.e., not on break). Because the display 18 may be positioned so as to be generally viewable by any spectator 16 in the seating area 15, if a spectator's 16 view of the live event 14 is or becomes hindered, such as from being seated far from the live event 14 or by another spectator 16 standing up in front of the hindered spectator 16, then the spectator 16 having the hindered view may turn his or her attention to the display 18 to continue observing the live event 14. In addition, the display 18 may show replays of exciting action occurring in the live event 14, but at a slower pace and/or at a closer angle, to enable the spectators 16 to view the exciting action with increased clarity.

In addition, the display 18 may show the live, close-up video of the spectators 16 when the live event 14 is on break, such as during a timeout, during an event transition, or between, before, or after active portions of a live event 14 (e.g., innings, quarters, halves, etc.). In particular, the display 18 may alternate between the live video captured by each of the video cameras 20, each live video including a different portion of the seating area 15. In this way, when the live event 14 is on break, a spectator 16 may view the display 18 to both observe other spectators 16 and determine whether he or she is currently being featured on the display 18. Because the display 18 may be positioned so as to be generally viewable by any spectator 16 in the seating area 15, when a spectator 16 is featured on the display 18, the spectator 16 may feel a brief moment of fame in that he or she is particularly visible to other spectators 16 at the live event 14. Hence, a spectator 16 who is featured on the display 18 may desire to memorialize this moment of fame, such as by receiving a commemorative photo or video clip that includes an image or video segment of the spectator 16 that was shown on the display 18.

To this end, the operating environment 10 may further include an image processing server 22. The image processing server 22 may be generally configured to capture spectator content, such as images and/or video segments that include at least one spectator 16, that is shown on the display 18, and may be generally configured to provide such spectator content to requesting users. In one embodiment, the image processing server 22 may tap into the video feed of the display 18, and thereby receive the same video data that is received at the display 18. From the received data, the image processing server 22 may be configured to retrieve and categorize images and/or video segments that include one or more of the spectators 16 at the live event 14. The image processing server 22 may then provide such images and/or video segments to users over a network 26, such as the Internet.

For example, a spectator 16 who was featured on the display 18 may utilize a user device 28, such as a mobile phone, a personal computer, a tablet, or the like, or may utilize a kiosk 30 to access the image processing server 22 over the network 26. The spectator 16 may then search the image processing server 22 for an image or video segment that includes the spectator 16. After finding a desired image or video segment, the spectator 16 may elect to purchase the image or video segment, and the image processing server 22 may then provide the image or video segment to the requesting spectator 16, such as via printing at the kiosk 30 (for the image) and/or via electronic delivery over the network 26. Additionally or alternatively, prints of the desired image, or a non-transitory computer readable medium comprising the desired video segment, may be mailed to the requesting user. A user may also select various processing options for a selected image or video segment, such as adding a background, a border, and/or a description of the live event 14 (e.g., identification, score, date, context of the image, etc.) to the image or video segment.

The operating environment 10 may also include one or more stationary cameras 24 that are adapted to capture video or still images of the display 18. More particularly, each of the stationary cameras 24 may be configured to capture a different viewpoint of the display 18 during the live event 14. For example, one stationary camera 24a may be positioned so as to capture video or still images of the portion of the display 18 that shows the live, close-up video captured by the video cameras 20 (e.g., FIG. 9A). Another stationary camera 24b may be positioned so as to capture additional portions of the display 18, and may further be positioned so as to capture a portion of the seating area 15 (e.g., FIG. 9B). And another stationary camera 24c may be positioned so as to capture even more content, such as the display 18, a portion of the seating area 15, and a portion of the live event 14 (e.g., FIG. 9C). The stationary cameras 24 may be coupled to the image processing server 22 such that the image processing server 22 is able to control operation of the stationary cameras 24 and/or receive the still images or video captured by the stationary cameras 24. From the received video or still images, the image processing server 22 may be configured to retrieve and categorize images and/or video segments that were shown on the display 18 and include one or more of the spectators 16 at the live event 14. Moreover, the image processing server 22 may be configured to store images of the different viewpoints captured by the stationary cameras 24 (which may be extracted from video captured by the stationary cameras 24), and enable a user to request that one of these viewpoint images be used as a frame (a.k.a. background) image on which to superimpose a selected image or video segment of one or more spectators 16.

In the illustrated embodiment, the image processing server 22 is included within the venue 12, and the kiosk 30 and the user device 28 are located outside of the venue 12. However, in alternative embodiments, the image processing server 22 may be, at least partially, remotely located from the venue 12 and receive data via the network 26. In other words, the image processing server 22 may include a component that is located within the venue 12, and a component that is located outside the venue 12 and is accessible through the network 26. Furthermore, in alternative embodiments, the kiosk 30 and/or the user device 28 may be located within the venue 12.

Figure 2:
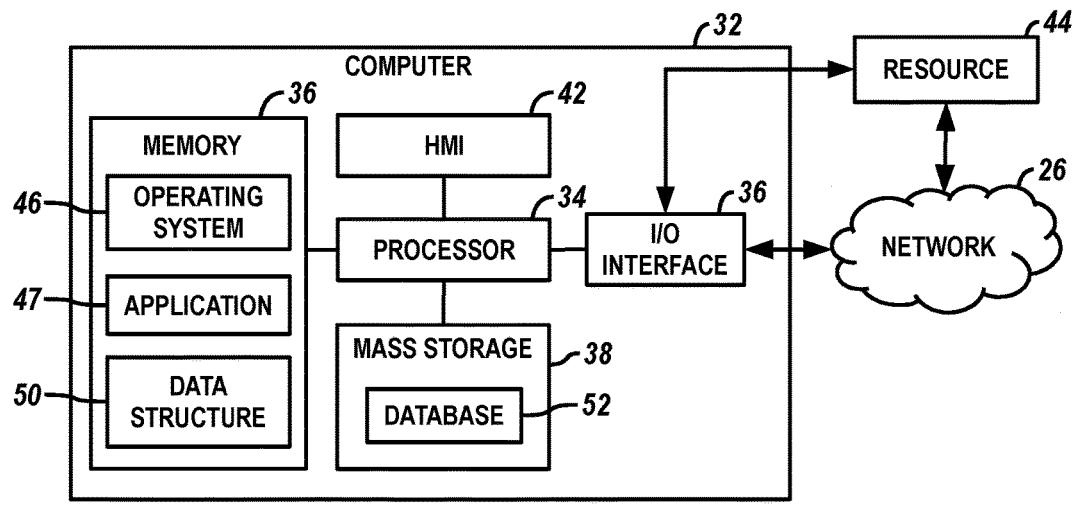
FIG. 2 is a schematic view of an exemplary computer system of FIG. 1.

Referring now to FIG. 2, the image processing server 22, the kiosk 30, and the user device 28 may be implemented on one or more computer devices or systems, such as exemplary computer system 32. The computer system 32 may include a processor 34, a memory 36, a mass storage memory device 38, an input/output (I/O) interface 40, and/or a Human Machine Interface (HMI) 36. The computer system 32 may also be operatively coupled to one or more external resources 44 via the network 26 or I/O interface 40. External resources may include, but are not limited to, servers, databases, mass storage devices, peripheral devices, cloud-based network services, or any other suitable computer resource that may be used by the computer system 32.

The processor 34 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 36. Memory 36 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or any other device capable of storing information. The mass storage memory device 38 may include data storage devices such as a hard drive, optical drive, tape drive, non-volatile solid state device, or any other device capable of storing information.

The processor 34 may operate under the control of an operating system 46 that resides in memory 36. The operating system 46 may manage computer resources so that computer program code embodied as one or more computer software applications, such as an application 48 residing in memory 36, may have instructions executed by the processor 34. In an alternative embodiment, the processor 34 may execute the application 48 directly, in which case the operating system 46 may be omitted. One or more data structures 50 may also reside in memory 36, and may be used by the processor 34, operating system 46, or application 48 to store or manipulate data.

The I/O interface 40 may provide a machine interface that operatively couples the processor 34 to other devices and systems, such as the network 26 or external resource 44. The application 48 may thereby work cooperatively with the network 26 or external resource 44 by communicating via the I/O interface 40 to provide the various features, functions, applications, processes, or modules comprising embodiments of the invention. The application 48 may also have program code that is executed by one or more external resources 44, or otherwise rely on functions or signals provided by other system or network components external to the computer system 32. Indeed, given the nearly endless hardware and software configurations possible, persons having ordinary skill in the art will understand that embodiments of the invention may include applications that are located externally to the computer system 32, distributed among multiple computers or other external resources 44, or provided by computing resources (hardware and software) that are provided as a service over the network 26, such as a cloud computing service.

The HMI 42 may be operatively coupled to the processor 34 of computer 32 in a known manner to allow a user to interact directly with the computer 32. The HMI 42 may include video or alphanumeric displays, a touch screen, a speaker, and any other suitable audio and visual indicators capable of providing data to the user. The HMI 42 may also include input devices and controls such as an alphanumeric keyboard, a pointing device, keypads, pushbuttons, control knobs, microphones, etc., capable of accepting commands or input from the user and transmitting the entered input to the processor 34.

A database 52 may reside on the mass storage memory device 38, and may be used to collect and organize data used by the various systems and modules described herein. The database 52 may include data and supporting data structures that store and organize the data. In particular, the database 52 may be arranged with any database organization or structure including, but not limited to, a relational database, a hierarchical database, a network database, or combinations thereof. A database management system in the form of a computer software application executing as instructions on the processor 34 may be used to access the information or data stored in records of the database 52 in response to a query, where a query may be dynamically determined and executed by the operating system 46, other applications 48, or one or more modules. In one exemplary embodiment of the invention, the database 52 may comprise a spectator image database 64 (FIG. 3) that includes images or video segments of spectators 16 captured from displays 18 at live events 14, and/or a frame image database 65 (FIG. 3) that includes frame images on which a captured image or video segment of one or more spectators 16 may be superimposed at a user's request.

Figure 3:
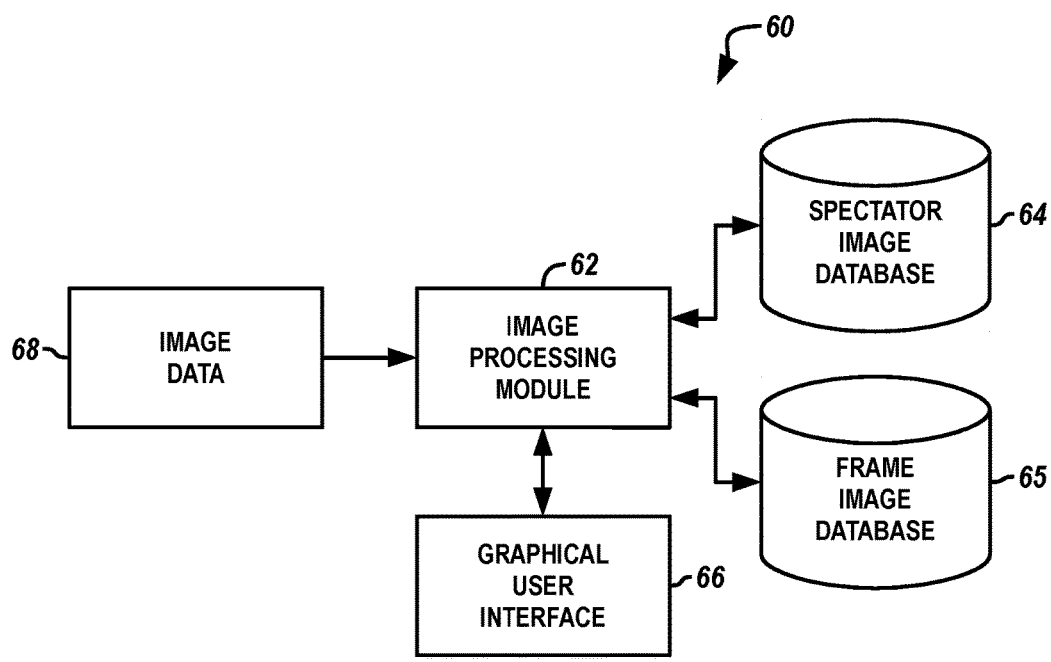
FIG. 3 is a schematic view of an exemplary processing architecture that may be utilized to capture images of spectators at live events.

FIG. 3 illustrates an image processing architecture 60 that may include an image processing module 62, a spectator image database 64, a frame image database 65, and/or a graphical user interface 66. The image processing architecture 60 may be provided by one or more of the image processing server 22, the kiosk 30, the user device 28, and/or any other suitable system. In operation, the image processing module 62 may receive image data 68, such as from the video cameras 20 or the stationary cameras 24. For example, the image data 68 may include live video of the spectators 16 and the live event 14 that is captured by the video cameras 20 and shown on the display 18 during the live event 14. In addition or alternatively, the image data 68 may include video or still images having one or more viewpoints of the display 18 that is captured by the stationary cameras 24 during the live event 14.

The image processing module 62 may be configured to analyze the image data 68 to capture images or video segments therefrom that were shown on the display 18 and include at least one of the spectators 16. The image processing module 62 may further be configured to store such images or video segments in the spectator image database 64. Similarly, the image processing module 62 may be configured to analyze the image data 68 to capture images therefrom that include different viewpoints of the display 18, which may serve as a frame image for one of the images or video segments stored in the spectator image database 64. The image processing module 62 may be configured to store such frame images in the frame image database 65.

The image processing module 62 may further be configured to generate the graphical user interface 66, which may be displayed on the user device 28 or the kiosk 30. In this way, a spectator 16 or other user may access the graphical user interface 66 from the kiosk 30 or the user device 28, and utilize the graphical user interface 66 to search for and purchase an image or video segment of one or more spectators 16 that was shown on the display 18 and was stored in the spectator image database 64. The spectator 16 may also add effects to an image or video segment selected from the spectator image database 64, such as placing the selected image or video segment into a frame image stored in the frame image database 65.

Figure 4:
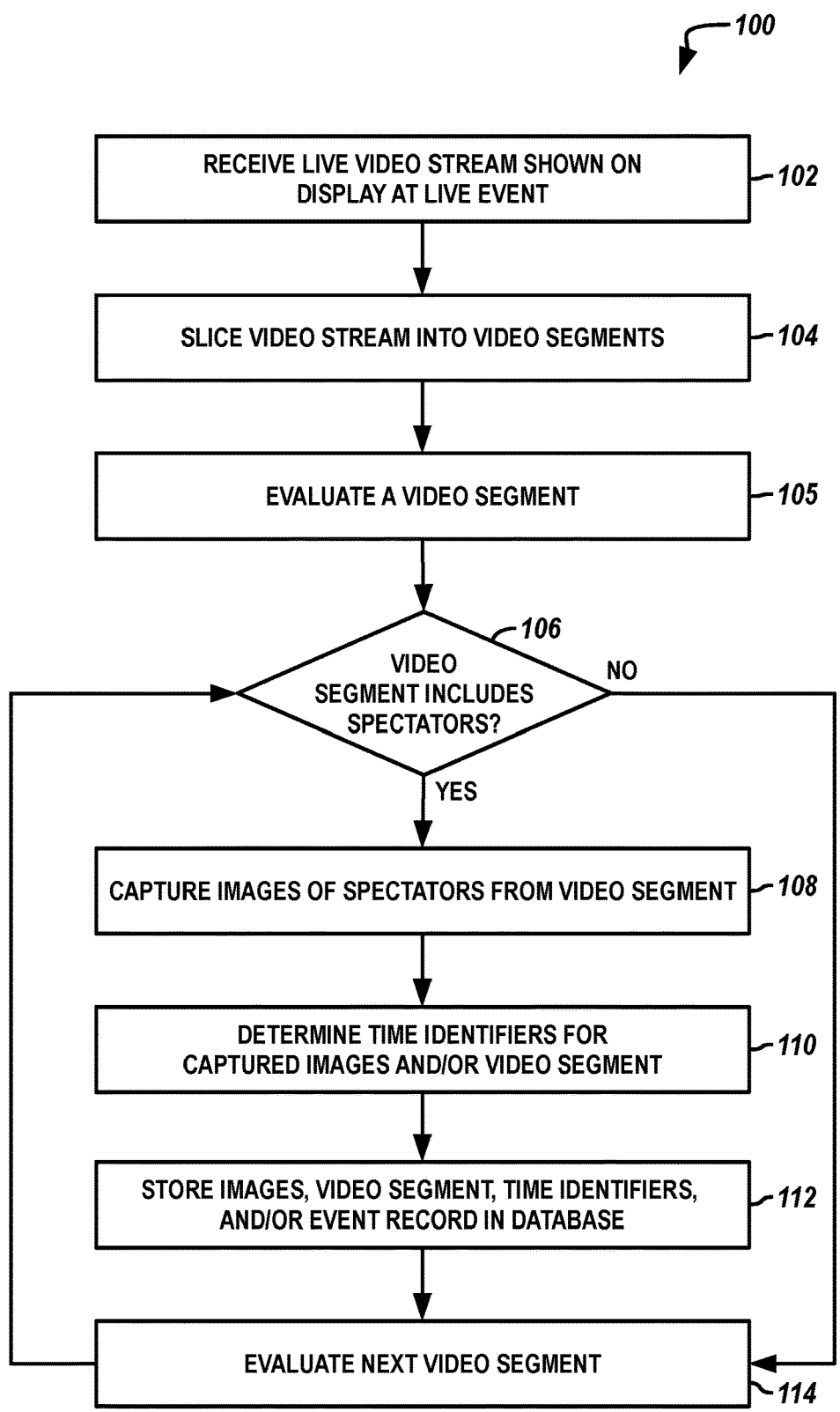
FIG. 4 is a flowchart of an exemplary process for capturing images of spectators at live events.

FIG. 4 provides an exemplary process 100 for capturing images and/or video segments that are shown on the display 18 and include one or more spectators 16. The process 100 may be performed by the image processing architecture 60. In block 102, a stream of live video may be received, such as at the image processing module 62. More particularly, the image processing module 62 may tap into the video feed of the display 18 and thereby receive the stream of live video that is shown on the display 18 at the live event 14. As previously described, the stream of live video that is shown on the display 18 may include one or more images of the live event 14 and one or more images of spectators 16 at the live event 14.

In block 104, the received video stream may be sliced into video segments, each which includes a chronological sequence of images that are very close in time to one another. Each video segment may include a different person or a different group of persons. For example, the image processing module 62 may be configured to utilize facial recognition software to determine when the received video stream includes a person or a group of persons, and when the video stream changes from featuring one person or group to featuring another scene, which may include another person or group. Based on the detected changes, the image processing module 62 may be configured to automatically create a video segment for each new person or group featured in the video stream.

Each video segment may then be evaluated. More particularly, in block 105, one of the video segments may be evaluated so as to determine whether the video segment includes spectators 16 or participants of the live event 14 (e.g., players). The image processing module 62 may be configured to make this determination based on pixel analysis and/or facial recognition. More particularly, the image processing module 62 may maintain a database of facial profiles for each participant of the live event 14, such as the players of each sporting team. Additionally or alternatively, the image processing module 62 may maintain a pixel profile relating to the live event 14, which may include one or more colors (e.g., the color of a field) and/or one or more pixel configurations (e.g., graphics painted on a field) expected to be in the area dedicated to the live event 14. For each video segment, the image processing module 62 may be configured to compare the video segment to the facial profiles and/or the pixel profile to determine whether the video segment likely includes participants of the live event 14 or spectators 16 at the live event 14. For example, if the image processing module 62 determines that at least a predetermined percentage of the pixels in a video segment match the color of the field for the live event 14, then the image processing module 62 may determine that the video segment includes participants of the live event 14, and not spectators 16.

The image processing module 62 may also utilize the status of the live event 14 when a video segment is shown on the display 18 to determine whether the video segment includes participants of the live event 14 or spectators 16. For example, if a video segment is shown on the display 18 (i.e., received from the video feed for the display 18) when the live event 14 is on break, then the image processing module 62 may be configured to determine that the video segment includes spectators 16. Alternatively, the live event 14 being on break may be a precursor (e.g., necessary precondition) for determining whether a video segment includes spectators 16 or participants of a live event 14. More particularly, the image processing module 62 may be configured to first determine whether the live event 14 is on break when a video segment is shown on the display 18, and if so, determine whether the video segment includes spectators 16 using one or more of the techniques described above.

If a video segment is determined to not include one or more spectators 16 ("NO" branch of block 106), then, in block 114, a next video segment may be evaluated. Alternatively, if a video segment is determined to include one or more spectators 16 ("YES" branch of block 106), then, in block 108, one or more images of the one or more spectators 16 may be captured from the video segment. In particular, the image processing module 62 may create an image set from the video segment by capturing an image from the video segment at regular intervals. For example, two to three images may be captured from the video segment per second. Because each video segment may include the same one or more spectators 16 throughout the segment, each image of an image set may also include the same one or more spectators 16.

In block 110, one or more time identifiers may be determined for the image set and/or video segment. The time identifiers determined for an image set and/or video segment may indicate when the image set and/or video segment is shown on the display 18 (i.e., received from the video feed of the display 18), and/or may indicate when each image of the image set is shown on the display 18. In one embodiment, the one or more time identifiers may include a time of day and/or a time relative to the live event 14. For example, when the live event 14 is a sporting event, the one or more time identifiers may include a time of day, which may be an exact time or a timespan (e.g., 5 PM to 6 PM), and/or a portion of the sporting event (e.g., the quarter, half, inning, period, or time therebetween, the time remaining in the live event 14, etc.) in which a video segment and/or image was shown on the display 18.

In block 112, the image set, the video segment, the time identifiers, and/or an event record may be stored in a database, such as the spectator image database 64. The event record may include any data suitable for identifying the live event 14, such as the type (e.g., concert, sporting event, etc.), the sub-type (e.g., football, baseball, basketball, etc.), the level (e.g., college, professional, etc.), the affiliation (e.g., league, conference, division, etc.), the date, the location, the start time, and/or the participants related to the live event 14. The image processing module 62 may be configured to store the image set, video segment, time identifiers, and/or event record in the spectator image database 64 such that the image set and/or video segment is linked with the time identifiers and/or the event record in the spectator image database 64. In addition, each image set may be linked in the spectator image database 64 to the video segment from which the image set was captured. In one embodiment, the time identifiers and/or event record for an image set and/or video segment may be stored in metadata for the images of the image set and/or the video segment.

After (or concurrently with) the performance of blocks 108, 110, and/or 112 of the process 100, in block 114, another one of the video segments may be evaluated so as to determine whether it includes one or more spectators 16. By processing multiple video segments in parallel, the overall latency of a system configured to implement the process 100 is reduced.

Although the process 100 has been described in the context of one embodiment, it will be understood that parts of the process 100 may be altered or omitted without departing from the spirit of the process 100. For example, rather than slicing the received video stream into video segments, the image processing module 62 may be configured to determine when the received video stream includes one or more spectators 16 and, in response to making such a determination, capture images of spectators 16 directly from the received video stream, such as at regular intervals. Alternatively, the image processing module 62 may be configured to capture images from the video stream at regular intervals, such as at a rate of two to three images per second, irrespective of the content of the video stream, and thereafter determine which of the captured images includes spectators 16 using the techniques described above. Furthermore, each of the blocks of the process 100 may be performed automatically and/or may be performed in essentially real-time (i.e., as the video stream is received and buffered). Alternatively, one or more of the blocks of the process 100 may be performed manually by a user and/or may be performed after at least a portion of the video stream has been received and stored. As an example of manual performance, a user may manually select when the received video stream includes one or more spectators 16, and/or when the video stream changes from including one individual or group of spectators 16 to another individual or group of spectators 16.

In an alternative embodiment, rather than capturing video segments and images of spectators 16 that are shown on the display 18 from the received video stream, the image processing module 62 may capture such video segments and images via the one or more stationary cameras 24. More particularly, at least one of the one or more stationary cameras 24, such as the stationary camera 24a, may be centered on and configured to capture the portion of the display 18 that shows the live, close-up video of the live event 14 and the spectators 16 that is captured by the video cameras 20. In this embodiment, the image processing module 62 may determine, from the video feed of the display 18 and/or using the above-described techniques, and/or based on a manual indication from an operator, whether the display 18 is currently showing spectators 16. If so, the image processing module 62 may instruct the stationary camera 24a to start capturing images of the display 18 at regular intervals, such as at a rate of every two to three images per second, or instruct the stationary camera 24a to start capturing video of the display 18. Thereafter, when the image processing module 62 determines that the display 18 is no longer showing spectators 16, such as using the techniques described above and/or based on another manual indication from an operator, the image processing module 62 may instruct the stationary camera 24a to stop capturing images or video. The image processing module 62 may then receive the images or video from the stationary camera 24a, and may create an image set or video segment for each spectator 16 or group of spectators 16 using the techniques described above (e.g., facial recognition, comparison with a pixel profile and/or known facial profiles, etc.).

In yet another embodiment, the image processing module 62 may instruct the stationary camera 24a to continuously capture images at regular intervals of the display 18 or continuously capture video of the display 18 throughout the live event 14, and thereafter determine which of the captured images or which portions of the video include spectators 16. The image processing module 62 may then create an image set or video segment for each spectator 16 or group of spectators 16. In either of the above embodiments, the image processing module 62 may also determine the one or more time identifiers for each image set and/or video segment, and store the image sets and/or video segments in the spectator image database 64, as described above.

Figure 5:
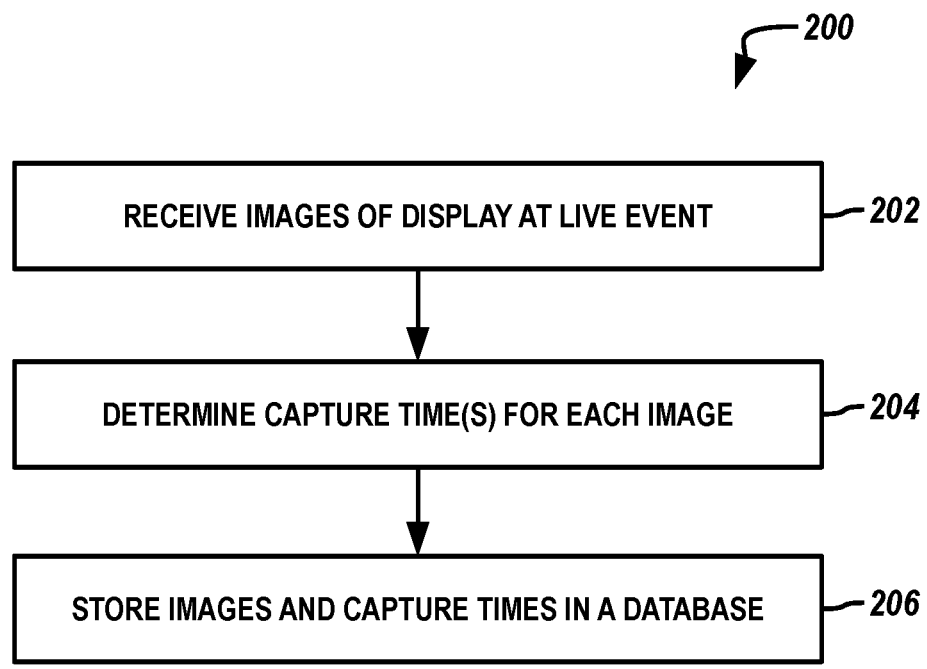
FIG. 5 is a flowchart of an exemplary process for capturing images of a display at a live event.

FIG. 5 provides a process 200 for capturing frame images, such as for the frame image database 65. Each frame image may include a window in which to place an image or video segment of one or more spectators 16 that was shown on the display 18 and is stored in the spectator image database 64 (e.g., FIGS. 9B and 9C). The process 200 may be performed by the image processing architecture 60, and may be performed in parallel with the process 100.

In block 202, images of the display 18 captured during the live event 14 may be received, such as at the image processing module 62, for use as frame images. More particularly, the image processing module 62 may receive still images or video of the display 18 from one or more of the stationary cameras 24, such as the stationary camera 24b and the stationary camera 24c. Each of these stationary cameras 24 may be positioned so as to capture the display 18 from a different viewpoint having varied amounts of content. For example, the stationary camera 24b may be positioned so as to capture the display 18, including the portion thereof showing the video captured by the video cameras 20 and portions thereof showing other information (e.g., teams, score, time remaining, etc.), and/or a portion of the seating area 15 (e.g., FIG. 9B). The stationary camera 24c may be positioned so as to capture additional content, such as a portion of the live event 14 (e.g., FIG. 9C). If video of the display 18 is received from the stationary cameras 24b and 24c, the image processing module 62 may extract images of the display 18 from the received video for use as the frame images.

In one exemplary embodiment, the image processing module 62 may be configured to instruct the stationary cameras 24b, 24c to capture still images of the display 18 at regular intervals, such as every one second to every thirty seconds, during the live event 14. In another exemplary embodiment, when, as described above, at least one stationary camera 24 (e.g., stationary camera 24a) is centered on and configured to capture the portion of the display 18 showing the live, close-up video, the image processing module 62 may be configured to instruct the other stationary cameras 24 (e.g., stationary cameras 24b, 24c) to capture still images or video of the display 18 whenever the former stationary camera 24 (e.g., stationary camera 24a) is instructed to do so. In yet another embodiment, the image processing module 62 may instruct the stationary cameras 24b, 24c to continuously capture video of the display 18 during the live event 14.

In block 204, one or more capture times for each of the images of the display 18 (which may have been originally captured as still images or may have been extracted from received video of the display 18) may be determined and/or recorded. Similar to the time identifiers described above, the capture times may indicate when each image of the display 18 was captured by one of the stationary cameras 24. Specifically, the capture times for one of the images of the display 18 may include a time of day in which the image was captured and/or a time relative to the live event 14. For example, when the live event 14 is a sporting event, the capture times may indicate a time of day, which may be an exact time or a timespan (e.g., 5 PM to 6 PM), and/or a portion of the sporting event (e.g., the quarter, half, inning, period, or time therebetween, the time remaining in the live event 14, etc.) that the image of the display 18 was captured by the stationary cameras 24.

In block 206, the images of the display 18 (i.e., the frame images) may be stored in a database, such as the frame image database 65, such that each frame image is linked with its determined and/or recorded capture times and/or an event record within the frame image database 65. The event record may be the same as the event record stored in the spectator image database 64 described above.

Figure 6:
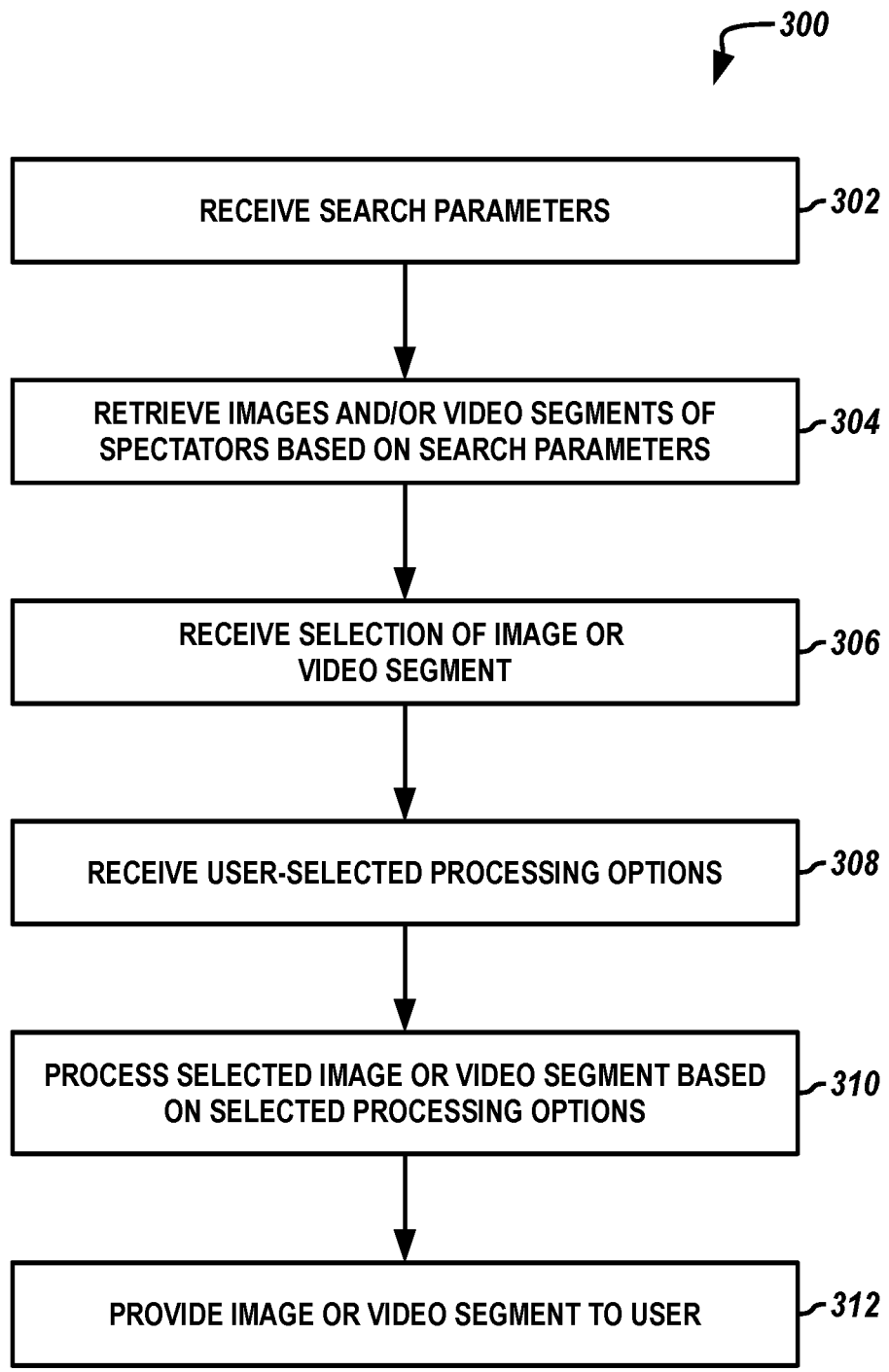
FIG. 6 is a flowchart of an exemplary process for providing images including spectators to a user.

FIG. 6 provides an exemplary process 300 that may be performed by the image processing architecture 60 to provide an image or video segment that was shown on the display 18 and includes one or more spectators 16 to a requesting user. In block 302, one or more search parameters may be received, such as at the image processing module 62, that relate to one or more of the image sets and/or video segments stored in the spectator image database 64. More particularly, a user may access the graphical user interface 66, such as via the kiosk 30 or a user device 28, to enter the one or more search parameters, which may then be sent to the image processing module 62. The one or more search parameters may include any criteria suitable for identifying a live event 14 and/or a portion of the live event 14 in which a particular spectator 16 or group of spectators 16 was featured on the display 18. For example, the search parameters may relate to and/or include at least one of the one or more time identifiers and/or at least a portion of the event record linked with one or more image sets and/or video segments in the spectator image database 64.

As a more specific example, the graphical user interface 66 may first prompt a user to identify the live event 14, such as by making an initial selection of the type of live event 14 (e.g. concert, sporting event, etc.) Thereafter, the graphical user interface 66 may prompt the user to enter additional details about the selected event type. For instance, in the case where the live event 14 is a professional baseball game, once the user has selected that the live event 14 is a sporting event, the user may be prompted to select a type of sport, league, division, and/or conference relating to the live event 14. In this case, the user may indicate that the live event 14 relates to MAJOR LEAGUE BASEBALL. Thereafter, the graphical user interface 66 may prompt the user to select a team and a date of the live event 14. Alternatively, if the user is accessing the graphical user interface 66 via a kiosk 30 that is located at the live event 14, identification of the specific live event 14 may be known and thus one or more of these prompts may be omitted.

Once the specific live event 14 is known, the graphical user interface 66 may prompt the user to select a time of day, which may be an exact time or a timespan (e.g., 5 PM to 6 PM), and/or a portion of the live event 14 (e.g., the quarter, half, inning, period, or time therebetween, the time remaining in the live event 14, etc.) that a particular spectator 16 or group of spectators 16 was featured on the display 18. Returning to the above example where the live event 14 is a baseball game, the graphical user interface 66 may prompt the user to enter the inning in which the particular spectator 16 or group of spectators 16 was featured on the display 18.

In some embodiments, the graphical user interface 66 may also enable a user to enter a picture of a face, such as a photo taken of one's self (a.k.a. a "selfie"), as a search parameter. Such a picture may be compared with the image sets and/or video segments in the spectator image database 64 using facial recognition software to determine image sets and/or video segments that include the provided face.

In addition, the graphical user interface 66 may further include a "just featured" button in which a spectator 16, upon or soon after being featured on the display 18, may select to indicate as such. The image processing module 62 may use such information, along with location information provided thereto, as search parameters. For example, selection of the just featured button may generally inform the image processing module 62 of the time of day that the spectator 16 was featured on the display 18 and/or the time relative to a live event 14 when the spectator 16 was featured. The location information may inform the image processing module 62 of the identification of the live event 14 in which the spectator 16 was or is present, and may be derived from information submitted by a spectator 16 via the graphical user interface 66, GPS data for the kiosk 30 or the user device 28 being used to access the graphical user interface 66, or identifiers transmitted from and representative of the location of the kiosk 30 or the user device 28 being used to access the graphical user interface 66.

As one example of the use of identifiers, the kiosk 30 or user device 28 may display the graphical user interface 66 via an app installed thereon or a website accessed therefrom that is specifically related to the live event 14 (e.g., the app or website may be specific to a certain sport, league, team, the live event 14 itself, etc.) Hence, when a user accesses the graphical user interface 66 through such an app or website, the image processing module 62 may be able to determine the location information based on an identifier that is transmitted from and identifies the app or website specifically related to the live event 14. For example, if the graphical user interface 66 is accessed through an app specific to a certain baseball team, the image processing module 62 may be able to identify the team from an identifier sent form the app. Thereafter, based upon when the just featured button is pressed, the image processing module 62 may be able to identify the specific live event 14 in which the spectator 16 is or was present (e.g., a live event 14 that matches the received identifier and that is currently occurring or recently ended).

In block 304, in response to receiving the one or more search parameters submitted by the user, images and/or video segments of one or more spectators 16 may be retrieved from the spectator image database 64 based on the received search parameters. More particularly, the image processing module 62 may search the spectator image database 64 for one or more image sets and/or video segments matching the received search parameters. For example, the image processing module 62 may retrieve image sets and/or video segments that are linked in the spectator image database 64 with time identifiers and/or an event record matching the received search parameters. And if the image sets and/or video segments are retrieved in response to the just featured button being pressed, then the image processing module 62 may retrieve image sets and/or video segments that are linked with time identifiers prior to when the just featured button was pressed and/or with an event record matching the received location information described above.

Figure 7:
FIG. 7 shows a screen of an exemplary graphical user interface.

The image processing module 62 may then generate a plurality of representative images such that each matching image set and/or video segment relates to a different one of the representative images, and display such representative images on the graphical user interface 66. More particularly, each of the representative images may be based on or include an image from the image set and/or video segment that is related to the representative image and is stored in the spectator image database 64. In one example, each of the image sets may be linked within the spectator image database 64 to the video segment from which the image set was captured, and each of the representative images may be an image from a different one of the matching image sets, such as the first image of the matching image set or an inferior version thereof (e.g., a low-resolution, thumbnail, and/or shadowed version), as a representative for the image set and video segment from which the image set was captured. FIG. 7 illustrates a series of representative images, each representing a different image set and/or video segment. The representative images may be displayed in chronological order, such as according to the time identifiers linked with the image sets and/or video segments represented by the representative images in the spectator image database 64. The user may scroll through the representative images via the graphical user interface 66 to find an image set and/or video segment having a particular spectator 16 or group of spectators 16.

Figure 8:
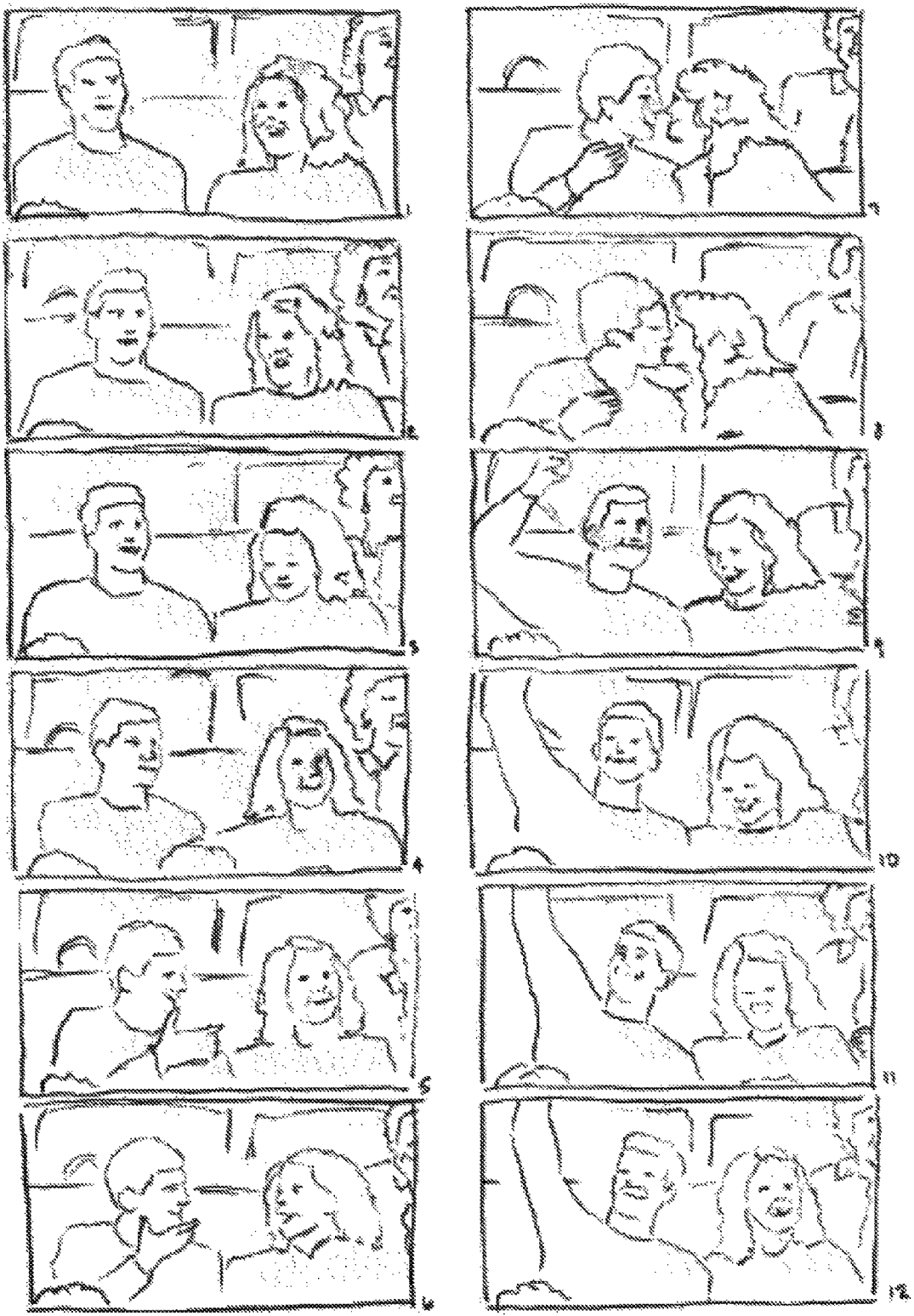
FIG. 8 shows another screen of the exemplary graphical user interface.

After locating a representative image that represents a desired image set or video segment, a user may select the representative image to cause the graphical user interface 66 to show the images of the image set and/or the video segment that the selected representative image represents. In other words, in response to receiving a selection of one of the representative images on the graphical user interface 66, the graphical user interface 66 may be altered to show each of the images of the image set related to the selected representative image, and/or the video segment related to the selected representative image. FIG. 8 illustrates a screen that may be provided by the graphical user interface 66 in response to a representative image being selected. Alternatively to the example shown in FIG. 8, each image of the image set and/or the video segment represented by the selected representative image may take up an entire display, and a user may scroll left or right to view the different images of the image set and/or the video segment. The images of a given image set may be displayed in chronological order, such as according to the time identifiers linked with each image of the image set in the spectator image database 64. Once the image set and/or video segment represented by the selected representative image is displayed, the user may select one of the images of the displayed image set and/or the displayed video segment via the graphical user interface 66 for purchase.

In some embodiments, when a representative image is selected, the graphical user interface 66 may be configured to display inferior versions of each image in the image set represented by the selected representative image, and/or an inferior version of the video segment represented by the selected representative image. For example, the graphical user interface 66 may display a low-resolution, thumbnail, and/or shadowed version of each image in the image set and/or of the video segment. In this way, a user is prevented from taking a screenshot, photo, or video of the graphical user interface 66 to capture an adequate and/or useable version of an image and/or video segment without providing payment. When an inferior version of an image and/or video segment is selected, or when a pointer is brought to hover over an inferior version of an image and/or video segment, a larger, albeit still inferior, version of the image and/or video segment may be displayed so as to enable a user to get a better view of the image and/or video segment, such as to determine if the spectator 16 or the group of spectators 16 of the image and/or video segment is smiling. The user may then select the larger, inferior version to proceed to purchase a non-inferior version of the image and/or video segment (e.g., a full-resolution, non-shadowed version).

In block 306, the user's selection of an image and/or video segment of one or more spectators 16 may be received, such as at the image processing module 62. More particularly, the user may utilize the graphical user interface 66 to select an image/or video segment that he or she wishes to purchase. The graphical user interface 66 may also provide an option that enables a user to order a flip book that includes two more images or each image of an image set represented by a selected representative image.

Figure 9C:
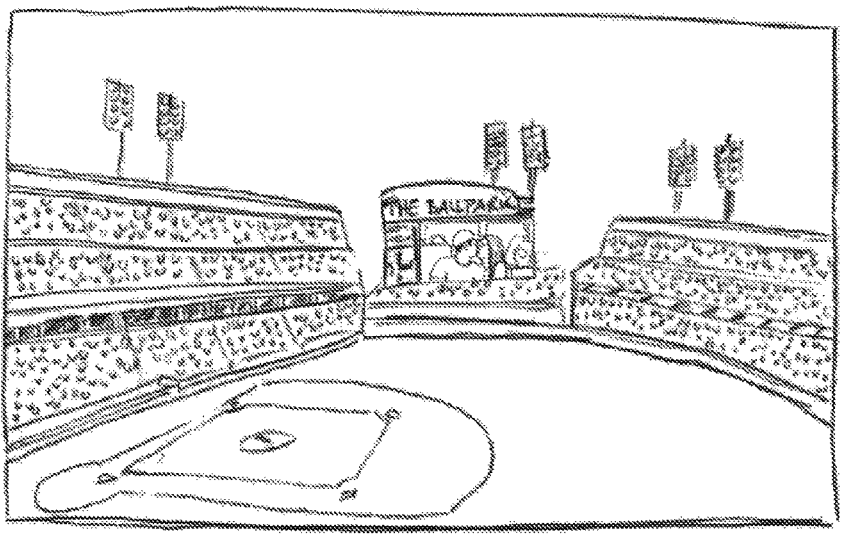
FIGS. 9A-C show exemplary images including spectators that may be provided to a user.
Figure 9B:
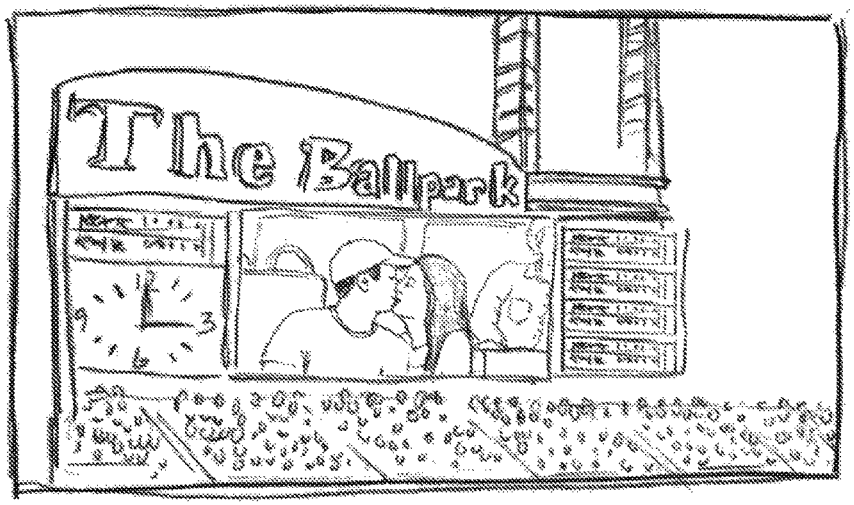
Figure 9A:
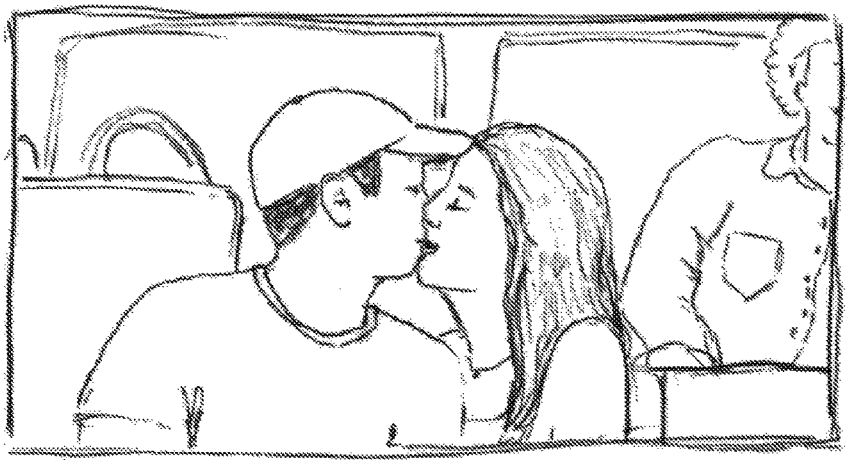

The graphical user interface 66 may also include one or more processing options for the selected image and/or video segment that are selectable by the user, which may be received in block 308, such as at the image processing module 62. Examples of the one or more processing options that may be offered to the user include a superimpose option, a border option, delivery options, and/or payment method options. For example, the user may request a copy of the selected image and/or video segment only, which is illustrated in FIG. 9A. Alternatively, the user may select the superimpose option to indicate a desire for the selected image and/or video segment to be superimposed or included on another graphic image, such as a stock background image, which may be a stock image of a portion of the venue 12 (e.g., a stock image of the display 18), or on one of the frame images stored in the frame image database 65, which is illustrated in FIGS. 9B and 9C. If the user opts to have a selected image and/or video segment superimposed or included on one of the frame images in the frame image database 65, the user may further select a desired viewpoint for the frame image, such as either the viewpoint captured by the stationary camera 24b or the viewpoint captured by the stationary camera 24c.

Figure 10A:
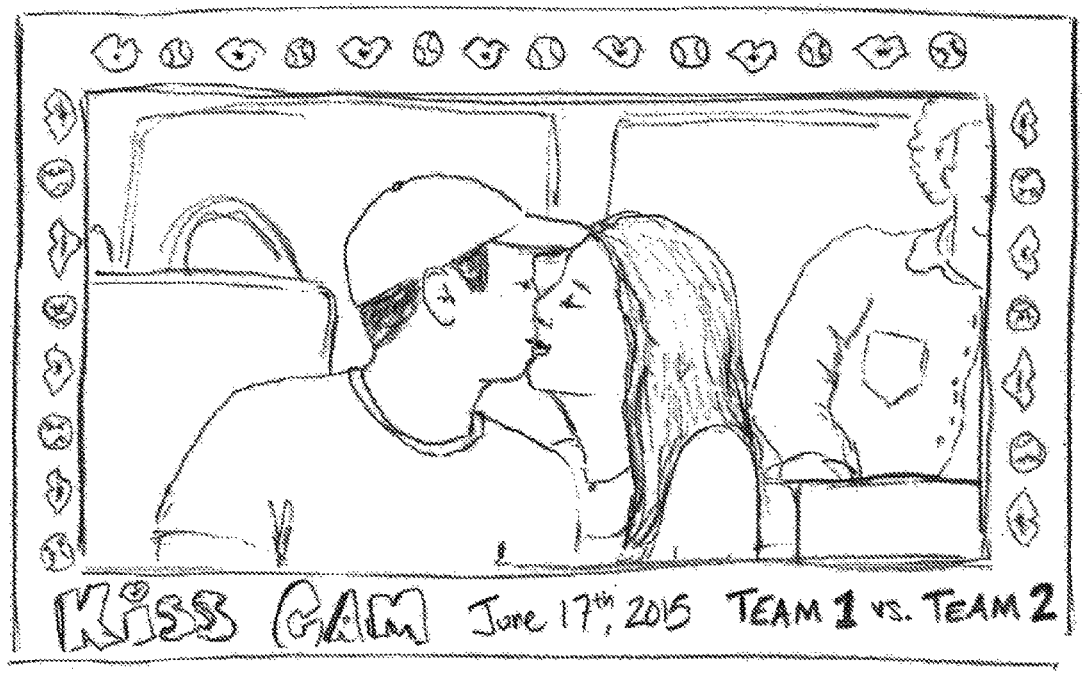
FIGS. 10A-B show exemplary borders that may be placed around images including spectators.
Figure 10B:
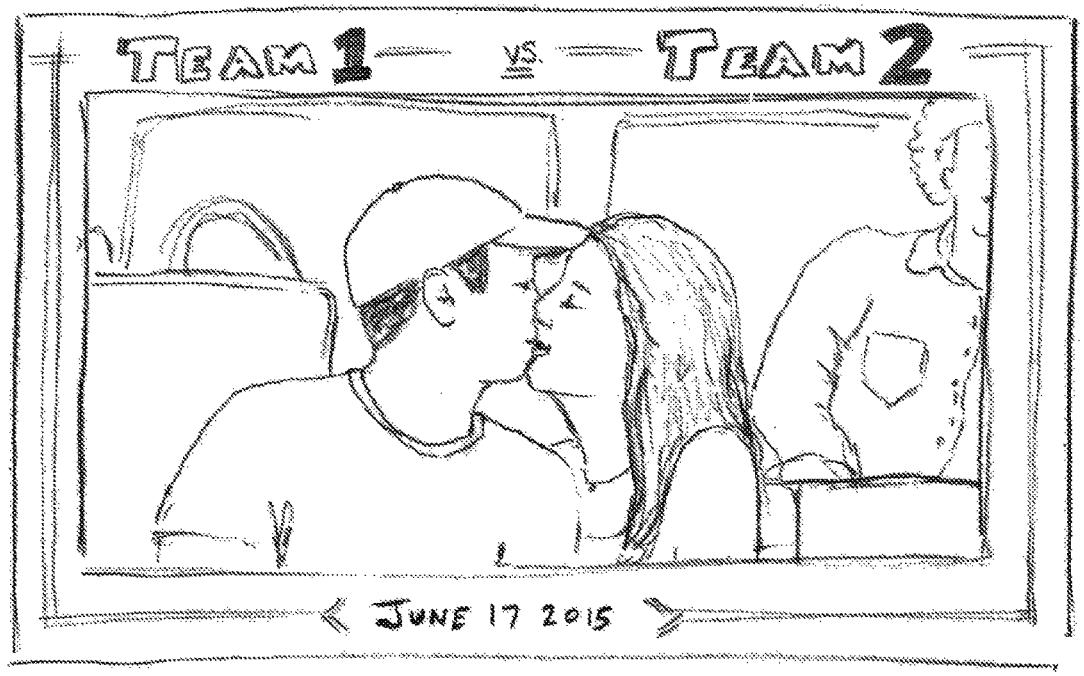

If the user selects the border option, then the selected image and/or video segment may be processed, such as by the image processing module 62, to place a border around the selected image and/or video segment, such as on a physical picture frame or in the form of a digital border, each of which may be additional options presented to and selectable by the user. The border may be decorative and/or may include information relating to or about the live event 14. More particularly, after selecting the border option, the user may select the type of information that is to be part of the border. Non-limiting examples of such information include an identification of the live event 14, a date, a final score, a logo or name of one or more of the participants of the live event 14, and/or a context of the image (e.g., the image was shown on the display 18 during a "Kiss Cam" portion of the live event 14). FIGS. 10A and 10B provide illustrations of selected images that have been placed in picture frames having such additional information. The graphical user interface 66 may further enable a user to customize the decorative aspects of the border for the selected image and/or video segment (e.g., customize the color, pattern, etc.) as part of the border option.

Another processing option that may be provided to the user via the graphical user interface 66 is an option to place decorations, effects, and/or text on the selected image and/or video segment itself, such as the additional information described above. In the case of a selected video segment, the graphical user interface 66 may also include one or more processing options that, when selected, request the selected video segment be provided in a slow-motion format and/or with an added sound clip (e.g., announcer commentary, sounds from the crowd, music, sound effects, a personal message from the requesting user). In the case of a selected image, another processing option that may be provided to the user via the graphical user interface 66 is an option to have the selected image placed onto an object, such as a cup, mug, magnet, blanket, phone case, pillow, ornament, etc.

As previously described, the graphical user interface 66 may also include multiple delivery options and/or payments options for the selected image and/or video segment that may be selectable by the user. For example, the graphical user interface 66 may include an electronic delivery option, a printing option, a mail option, and/or a transfer to a social website option.

In block 310, if one or more processing options have been selected by the user that relate to performing an operation on the selected image or video segment itself (e.g., the superimpose option, the border option, the option to apply decorations or text, the delivery options, and/or the slow-motion option), then the selected image or video segment may be processed according to these one or more processing options. For example, if the user has selected the superimpose option, then in response to receiving the user's selection, the image processing module 62 may query the frame image database 65 to determine a frame image that is nearest in time to when the image or video segment selected by the user was shown on the display 18. The "nearest-in-time" image may be determined based the determined and/or recorded capture times linked to each of the frame images in the frame image database 65. More particularly, the determination may be made by comparing the determined and/or recorded capture times linked to each of the frame images in the frame image database 65 and the one or more time identifiers linked with the user's selected image and/or video segment in the spectator image database 64. Furthermore, if the user has selected a specific viewpoint as part of the superimpose option, then the nearest-in-time image determination may be limited to those frame images having the selected viewpoint. Regardless, once the nearest-in-time frame image having the proper viewpoint (if one has been selected) is determined, the user's selected image and/or video segment may be superimposed onto the determined frame image.

As described above, in an alternative embodiment, the one or more stationary cameras 24, such as the stationary cameras 24b and 24c, may capture images or video of the display 18 at the same time that another stationary camera 24, such as the stationary camera 24a, captures images or video of the portion of the display 18 showing the live, close-up video of the one or more spectators 16. In this case, for each image and/or video segment of one or more spectators 16 that is stored in the spectator image database 64, one or more images having different viewpoints of the display 18 while showing the stored spectator image and/or video segment may be stored in the frame image database 65. In other words, under this embodiment, each of the images and/or video segments stored in the spectator image database 64 may already be included on at least one frame image in the frame image database 65. Accordingly, in this alternative embodiment, if the user selects an image or video segment from the spectator image database 64 and opts to have the selected image or video segment provided on a frame image having a certain viewpoint of the display 18, rather than superimposing the selected image or video segment onto the nearest-in-time frame image having the selected viewpoint, the image processing module 62 may process the selected image or video segment by merely retrieving the frame image that has the selected viewpoint and includes the user's selected image or video segment from the frame image database 65.

In block 312, the selected image or video segment, which may now be processed based on the user's selected processing options, may be provided to the user, such as according to one of the delivery options that a user has selected via the graphical user interface 66. In other words, providing the selected image or video segment to the user may include providing the processed version of the image or video segment to the user, if such processing options have been selected. In some embodiments, this may occur only after the user's selected payment method has been processed and approved. In further embodiments, after the image or video segment itself has been processed, but before the selected payment method has been processed, the graphical user interface 66 may generate a preview of the processed image or video segment for the user's review. The user may then elect to purchase the processed image or video segment by providing his or her payment method.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically comprises computer readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer readable program instructions for carrying out operations of the embodiments of the invention may be, for example, assembly language or either source code or object code written in any combination of one or more programming languages.

Various program code described herein may be identified based upon the application within that it is implemented in specific embodiments of the invention. However, it should be appreciated that any particular program nomenclature that follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention.

Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts, sequence diagrams, and/or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, and/or operations specified in the flowcharts, sequence diagrams, and/or block diagrams.

In certain alternative embodiments, the functions, acts, and/or operations specified in the flowcharts, sequence diagrams, and/or block diagrams may be re-ordered, processed serially, and/or processed concurrently consistent with embodiments of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. An image processing system, comprising:
    one or more processors; and
    memory coupled to the one or more processors, the memory including instructions that upon execution by the one or more processors cause the image processing system to:
        capture a first image of a spectator at a live event from video content that is captured by a plurality of cameras at the live event and is shown on a central display at the live event, the video content shown on the central display further including an image of a participant of the live event;
        determine one or more display time identifiers corresponding to when the first image is shown on the central display during the live event;
        store the first image and the one or more display time identifiers in a first database such that the first image is linked with the one or more display time identifiers within the first database;
        in response to the first image being shown on the central display and being stored in the first database, and to receiving, over a network, one or more search parameters submitted by a user via a graphical user interface on a user computing device, the one or more search parameters including a search time identifier corresponding to when the first image of the spectator was shown on the central display at the live event, retrieve the first image from the first database based on the search time identifier and the one or more display time identifiers linked with the first image in the first database; and
        after retrieving the first image, transmit the first image to the user computing device over the network, wherein the user computing device is configured to display the first image responsive to receiving the first image.

2. The image processing system of claim 1, wherein the instructions upon execution further cause the image processing system to:
    store a record of the live event in the first database such that the first image is linked with the record within the first database,
    wherein the one or more search parameters include an identification of the live event, and the instructions upon execution cause the image processing system to retrieve the first image based on the identification of the live event and the record linked with the first image.

3. The image processing system of claim 1, wherein the instructions upon execution further cause the image processing system to:
    prior to transmitting the first image to the user computing device, and responsive to the first image being retrieved from the first database, process the first image according to a processing option selected by the user via the graphical user interface,
    wherein the instructions cause the image processing system to transmit the first image to the user computing device over the network by causing the image processing system to:
        transmit the processed image over the network to the user computing device.

4. The image processing system of claim 3, wherein the instructions upon execution further cause the image processing system to:
    capture a plurality of second images during the live event via a stationary camera aimed at the central display, each of the second images being a different image of the central display, including a section of the central display that shows the video content during the live event, and being associated with a different capture time; and store the second images and the capture time for each second image in a second database such that each of the second images is linked with the capture time for the respective second image within the second database, wherein the processing option selected by the user is a superimpose option, and the instructions upon execution cause the image processing system to process the first image according to the processing option selected by the user by causing the image processing system to:

identify from the second images the second image that is nearest in time to the first image by comparing the capture time linked with each second image within the second database to the one or more display time identifiers linked with the first image; and superimpose the first image onto the section of the identified second image that shows the video content during the live event, wherein the processed image transmitted to the user computing device includes the first image superimposed onto the second image.

5. The image processing system of claim 4, wherein each second image includes a section of the central display that shows information about the live event that is associated with the capture time for the second image.

6. The image processing system of claim 1, wherein the instructions cause the image processing system to capture the first image from the video content by causing the image processing system to:

slice the video content into a plurality of video segments, wherein a first one of the video segments includes the first image;

determine which of the video segments includes one or more spectators; and capture a plurality of image sets from the video segments determined to include one or more spectators such that each of the image sets is captured from and includes one or more images from a different one of the determined video segments, wherein the video segments determined to include the one or more spectators include the first video segment, and the image set captured from the first video segment includes the first image.

7. The image processing system of claim 6, wherein the instructions cause the image processing system to store the first image in the first database by causing the image processing system to store the image sets in the first database, the one or more search parameters relate to each of the image sets and are submitted after the first image is shown on the central display and stored in the first database, and the instructions upon execution further cause the image processing system to:

in response to receiving the one or more search parameters submitted by the user that relate to each of the image sets, generate a plurality of representative images such that each of the image sets relates to a different one of the representative images, each of the representative images being based on the image set that is related to the representative image and that is stored in the first database;

transmit the representative images to the user computing device, wherein responsive to the user computing device receiving the representative images, the graphical user interface on the user computing device is configured to display and enable selection of the representative images; and in response to receiving a selection of one of the representative images on the graphical user interface on the user computing device, transmit the image set related to the selected representative image to the user computing device, wherein responsive to the user computing device receiving the image set relating to the selected representative image, the graphical user interface on the user computing device is configured to display the image set related to the selected representative image.

8. The image processing system of claim 6, wherein the instructions upon execution cause the image processing system to determine which of the video segments includes one or more spectators by causing the image processing system to:

for each video segment:
compare the video segment to a pixel profile relating to the live event; and
identify whether the video segment includes the one or more spectators based on the comparison.

9. The image processing system of claim 1, wherein the one or more display time identifiers corresponding to when the first image is shown on the central display and the search time identifier corresponding to when the first image was shown on the central display each identifies a portion of the live event in which the first image is shown on the central display.

10. The image processing system of claim 1, wherein the graphical user interface on the user computing device is configured to display a selectable button, the one or more search parameters are received by the image processing system in response to the button being selected, and the one or more search parameters include time data corresponding to when the button is selected and GPS data corresponding to the user computing device when the button is selected.

11. A method comprising:
by one or more processors:
capturing a first image of a spectator at a live event from a stream of video that is shown on a central display at the live event, wherein during the live event the central display shows first video content and second video content captured by a plurality of cameras at the live event, the first video content including an image of a participant of the live event, and the second video content including the first image of the spectator;

determining one or more display time identifiers corresponding to when the first image is shown on the central display during the live event;

storing the first image and the one or more display time identifiers in a first database such that the first image is linked with the one or more display time identifiers within the first database;

in response to the first image being shown on the central display and being stored in the first database, and to receiving, over a network, one or more search parameters submitted by a user via a graphical user interface on a user computing device, the one or more search parameters including a search time identifier corresponding to when the first image of the spectator was shown on the central display at the live event, retrieving the first image from the first database based on the search time identifier and the one or more display time identifiers linked with the first image in the first database; and after retrieving the first image, transmitting the first image to the user computing device over the network, wherein the user computing device is configured to display the first image responsive to receiving the first image.

12. The method of claim 11, further comprising:
storing a record of the live event in the first database such that the first image is linked with the record within the first database,
wherein the one or more search parameters include an identification of the live event, and retrieving the first image is further based on the identification of the live event and the record linked with the first image.

13. The method of claim 11, further comprising:
prior to transmitting the first image to the user computing device, and responsive to the first image being retrieved from the first database, processing the first image according to a processing option selected by the user via the graphical user interface, wherein transmitting the first image to the user computing device over the network comprises transmitting the processed image to the user computing device.

14. The method of claim 13, further comprising:
capturing a plurality of second images during the live event via a stationary camera aimed at the central display, each of the second images being a different image of the central display, including a section of the central display that shows the first video content and the second video content during the live event, and being associated with a different capture time; and
storing the second images and the capture time for each second image in a second database such that each of the second images is linked with the capture time for the respective second image within the second database,
wherein the processing option selected by the user is a superimpose option, and processing the first image according to the processing option selected by the user comprises:
identifying from the second images the second image that is nearest in time to the first image by comparing the capture time linked with each of the second images within the second database to the one or more display time identifiers linked to the first image; and
superimposing the first image onto the section of the identified second image that shows the first video content and the second video content during the live event, wherein the processed image transmitted to the user computing device includes the first image superimposed onto the second image.

15. The method of claim 14, wherein each second image includes a section of the central display that shows information about the live event that is associated with the capture time for the second image.

16. The method of claim 11, wherein capturing the first image from the stream of video comprises:
slicing the stream of video into a plurality of video segments, wherein a first one of the video segments includes the first image;
determining which of the video segments includes one or more spectators; and
capturing a plurality of image sets from the video segments determined to include one or more spectators such that each of the image sets is captured from and includes one or more images from a different one of the determined video segments,
wherein the video segments determined to include the one or more spectators include the first video segment, and the image set captured from the first video segment includes the first image.

17. The method of claim 16, wherein storing the first image in the first database comprises storing the image sets in the first database, the one or more search parameters relate to each of the image sets and are submitted by the user after the first image is shown on the central display and stored in the first database, and further comprising:
in response to receiving the one or more search parameters submitted by the user that relate to each of the image sets, generating a plurality of representative images such that each of the image sets relates to a different one of the representative images, each of the representative images being based on the image set that is related to the representative image and that is stored in the first database;
transmitting the representative images to the user computing device, wherein responsive to the user computing device receiving the representative images, the graphical user interface on the user computing device is configured to display and enable selection of the representative images; and
in response to receiving a selection of one of the representative images on the graphical user interface on the user computing device, transmitting the image set related to the selected representative image to the user computing device, wherein responsive to the user computing device receiving the image set related to the selected representative image, the graphical user interface on the user computing device is configured to display the image set related to the selected representative image.

18. The method of claim 11, wherein the one or more display time identifiers corresponding to when the first image is shown on the central display and the search time identifier corresponding to when the first image was shown on the central display each identifies a portion of the live event in which the first image is shown on the central display.

19. The method of claim 11, wherein the graphical user interface on the user computing device is configured to display a selectable button, the one or more search parameters are received in response to the button being selected, and the one or more search parameters include time data corresponding to when the button is selected and GPS data corresponding to the user computing device when the button is selected.

20. A system comprising:
a plurality of cameras located at a live event and configured, during the live event, to capture first video content that includes the live event and second video content that includes a plurality of spectators at the live event;
a central display located at the live event that shows the first video content and the second video content during the live event;
one or more processors; and
memory coupled to the one or more processors and including instructions that upon execution by the one or more processors cause the one or more processors to:
capture a first image of one of the spectators at the live event from the second video content;

determine one or more display time identifiers corresponding to when the first image is shown on the central display;

store the first image and the one or more display time identifiers in a first database such that the first image is linked with the one or more display time identifiers within the first database;

in response to the first image being shown on the central display and being stored in the first database, and to receiving, over a network, one or more search parameters submitted by a user via a graphical user interface on a user computing device, the one or more search parameters including a search time identifier corresponding to when the first image of the spectator was shown on the central display at the live event, retrieve the first image from the first database based on the search time identifier and the one or more display time identifiers linked with the first image within the first database; and after retrieving the first image, transmit the first image to the user computing device over the network, wherein the user computing device is configured to display the first image responsive to receiving the first image.

21. An image processing system, comprising:

one or more processors programmed to:

capture a first image of a spectator at a live event from video content that is captured by a plurality of cameras at the live event and is shown on a central display at the live event, the video content shown on the central display further including an image of a participant of the live event;

store the first image in a first database;

in response to the first image being shown on the central display and stored, and to receiving, over a network, one or more search parameters submitted by a user via a graphical user interface on a user computing device, the one or more search parameters including a second image of the spectator captured by the user computing device, retrieve the first image from the first database based on a comparison between the first image and the second image using facial recognition software; and after retrieving the first image, transmit the first image to the user computing device over the network, wherein the user computing device is configured to display the first image responsive to receiving the first image.

* * * * *